United States Patent [19]

Heissenberger et al.

[11] Patent Number: 4,481,118
[45] Date of Patent: Nov. 6, 1984

[54] METHOD AND APPARATUS FOR RINSING FILTER CAKE

[75] Inventors: Otto Heissenberger, Graz; Franz Petschauer, Lannach; Johann Sbaschnigg, Graz, all of Austria

[73] Assignee: Maschinenfabrik Andritz Actiengesellschaft, Graz-Andritz, Austria

[21] Appl. No.: 438,720

[22] Filed: Nov. 3, 1982

[30] Foreign Application Priority Data

Mar. 1, 1982 [AT] Austria ................................ 758/82

[51] Int. Cl.³ ............................................ B01D 33/04
[52] U.S. Cl. .................... 210/783; 210/400; 210/401; 210/409; 68/44; 68/158
[58] Field of Search .............. 210/783, 784, 772, 400, 210/401, 409, 380.3; 100/37; 162/60; 8/156; 68/181 R, 44, 158

[56] References Cited

U.S. PATENT DOCUMENTS

| 2,111,720 | 3/1938 | Padgett | 210/400 |
| 2,673,176 | 3/1954 | Whitney | 210/216 |
| 3,613,564 | 10/1971 | Adamski et al. | 210/401 |
| 3,774,760 | 11/1973 | Beristain et al. | 210/783 |
| 3,896,030 | 7/1975 | Bähr | 210/401 |
| 4,276,168 | 6/1981 | Bastgen | 210/401 |
| 4,348,290 | 9/1982 | Schipper | 210/400 |

Primary Examiner—Richard V. Fisher
Assistant Examiner—Wanda L. Millard
Attorney, Agent, or Firm—Kanz, Scherback & Timmons

[57] ABSTRACT

Disclosed are methods and apparatus for rinsing soluble materials from the filter cake formed in a double belt press. The belts with the filter cake therebetween are suspended between two spaced apart rollers to relieve pressure on the filter cake and the filter cake is simultaneously exposed to a rinse medium. Pressure is thereafter re-applied to the filter cake to extract the rinse medium therefrom.

16 Claims, 3 Drawing Figures

METHOD AND APPARATUS FOR RINSING FILTER CAKE

This invention relates to de-watering processes and apparatus. More particularly, it relates to methods and apparatus for rinsing the filter cake formed in de-watering apparatus to remove soluble materials from the filter cake.

Various apparatus are used to separate liquids from solids suspended therein. One of the more common devices comprises a pair of endless open-weave wire screens or porous belts, each of which rotates over a series of transverse rollers arranged in converging and/or serpentine arrangements wherein a slurry containing the suspended solids is compressed between the converging belts to remove liquids therefrom. Such double belt presses are commonly used, for example, to remove fluids such as water from a slurry of fiber or the like which has been chemically treated. For example, in pulp processing, chemicals such as soda lye, calcium and the like are used in the pulp processing and remain in the pulp slurry when the pulp slurry is processed through the de-watering machine. Thus a substantial amount of the chemicals may remain in the filter cake. It is desirable, of course, to remove the residual chemicals from the filter cake to the maximum extent possible with the minimum use of fresh water.

Prior attempts to remove chemicals from slurries involve various multi-stage filtering and washing systems wherein the entire slurry is rinsed and washed prior to de-watering. This requires large, bulky equipment and excessive amounts of fresh water. U.S. Pat. No. 2,111,720 to Padgett discloses an alternative process in which an attempt is made to rinse the filter cake. In the Padgett process, the filter cake, while confined between the opposing screen belts, is passed over a plurality of rolls in serpentine fashion while submerged in a rinse tank. The filter cake is then again pressed to remove rinse water therefrom.

The main disadvantage of the process disclosed by Padgett is that the pressure on opposite sides of the filter cake exerted by the screen belts is not relieved during the attempted rinsing process. Accordingly, while the filter cake passes through a bath of water, sufficient water cannot penetrate the filter cake to adequately rinse soluble materials therefrom, particular where high speed press machines are used. Even repeated immersion of the filter cake in a wash bath, as disclosed by Padgett, fails to sufficiently rinse the filter cake because re-wetting only occurs at the edges of the belt.

According to the present invention, methods and apparatus are provided to relieve compression of the filter cake while the filter cake is exposed to the the rinse medium, thereby permitting maximum penetration of the rinse medium throughout the filter cake with a minimum of exposure time to the rinse medium. Accordingly, only relatively small volumes of rinse water need be used to rinse filter cake travelling at relatively high speeds. Since the pressure on the filter cake is relieved while the filter cake is in the presence of the rinse medium, the rinse medium may thoroughly saturate the filter cake and dissolve the soluble materials therein for removal at a later press stage. Since the pressure on the filter cake is relieved during rinsing, the filter cake is more thoroughly rinsed with less rinse fluid, thus more thorough rinsing is achieved throughout the filter cake using less rinse medium and less rinse time while reducing the overall size of the machine and permitting use of extremely high speed belt travel. Other features and advantages of the invention will become more readily understood from the followed detailed description taken in connection with the appended claims and attached drawings in which:

Figure 1:
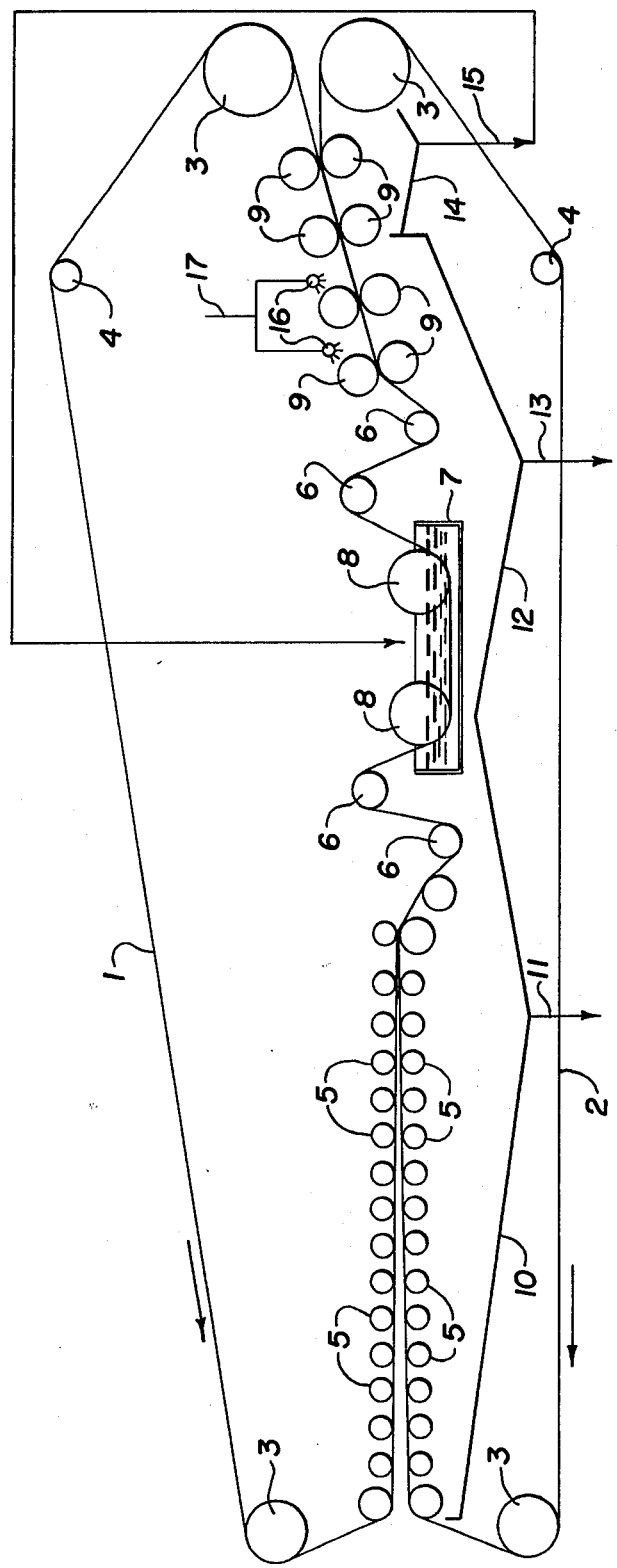
FIG. 1 is a schematic illustration of a double wire belt press employing the preferred embodiment of the invention.

For convenience and clarity of illustration, the invention will be described herein with specific reference to a double wire belt press as used to remove water from a pulp slurry and the use of water as the rinse medium. It will be readily appreciated, however, that the invention is not so limited. The principles of the invention are applicable for use in connection with any double belt press which removes liquid from a slurry or the like by compressing the slurry between the belts. Likewise, although water is described herein as the rinsing medium, it will be readily apparent that other solvents may be used depending upon the slurry and the process under consideration.

As illustrated in the drawings, the invention is adapted for use in connection with a double wire press which comprises a first endless wire belt 1 and a second endless wire belt 2 which receive the slurry therebetween and compress the slurry to remove liquids therefrom. The upper belt 1 is arranged over a plurality of rollers 3, 4, 5, 6, 8 and 9 and driven for travel in the direction indicated by the arrow. Similarly, lower belt 2 is arranged for continuous travel over a similar series of rollers 3, 4, 5, 6, 8 and 9 in a similar fashion in the direction indicated by the arrow. In conventional manner, the rollers 4 are adapted to maintain the desired tension on the belts and a number of opposed pairs of pressure rollers 5 are provided at the inlet end of the apparatus to define a gradually decreasing tapered wedge zone between the belts 1 and 2. The belts 1 and 2 passing over rollers 5 are gradually converged and, after the belts are converged, they are drawn over a series of S rollers 6 arranged to draw the belts through a serpentine arrangement substantially in a shape of an S whereat both belts are drawn over the same roller simultaneously.

The foregoing description is conventional of a double wire press wherein a slurry of liquid containing solids suspended therein is positioned in the inlet end of the wedge zone and, as the belts converge, liquid is extracted from the slurry as increasing pressure is applied to opposite sides of the belts. Thereafter, the compressed material is further squeezed by the belts passing simultaneously over the S rollers to form a filter cake. As the water is removed, a filter cake is formed which remains trapped between the belts 1 and 2.

In accordance with the invention as illustrated in FIG. 1, the belts and filter cake are passed under a pair of dip rollers 8 partially submerged in a tank 7. The dip rollers 8 are spaced apart substantially horizontally so that the belts and filter cake passing thereunder travel in a linear manner from the surface of the first dip roller to the second dip roller substantial parallel or slightly inclined with respect to the surface of the solvent contained within the tank 7. Since the dip rollers 8 are not necessarily intended to apply compression to the filter cake, they are relatively large diameter rollers. Furthermore, to permit relief of pressure on the filter cake trapped between the belts 1 and 2, the linear distance between the dip rollers 8 is approximately three times to approximately four times the diameter of rollers 8. Preferably, rollers 8 are of the same diameter. However, if one dip roller is larger than the other, it is preferable that the linear distance between the rollers in the direction of travel of the belt be approximately three to approximately four times the diameter of the smaller of the two dip rollers 8. Since the dip rollers 8 are spaced substantially apart, the pressure exerted on the filter cake trapped between the belts is substantially released since there are no forces applied to the belt normal to the direction of travel during the time the belts are travelling between the dip rollers 8. Since the compression pressure applied by the belts is substantially relieved, the filter cake may expand and readily absorb solvent.

After passing over the second dip roller 8, the belts are withdrawn from the solvent tank 7 and passed over a second series of S rollers 6 arranged to re-apply pressure to the belts and therefore squeeze the solvent from the filter cake trapped between the belts. After passing through the second S section, the opposed belts are passed between a plurality of pairs of opposed high pressure rollers 9 arranged to apply increasing pressure to the opposite sides of the belts and further press liquid from the filter cake.

In the perferred embodiment, spray nozzles 16 are positioned between successive pairs of high pressure rollers 9 in the high pressure zone to spray additional solvent from solvent line 17 directly onto the belts. After the belts and filter cake have passed the final pressure zone, the belts are separated and the filter cake removed from the machine in conventional fashion.

Collector 10 is positioned beneath the wedge zone and first S zone to collect the first fluids removed from the slurry. Likewise, collector 12 is positioned beneath the second S zone and a third collector 14 is provided beneath the last section of the high pressure zone to collect rinse liquid extracted from the filter cake in the final rinse. Each collector is provided with an outlet 11, 13 and 15, respectively, which directs the collected fluids to an appropriate reservoir (not shown). If desired, outlet 15 from collector 14 may be directed to tank 7 (as shown in FIG. 1) so that solvent extracted in the final rinsing process maybe used as the solvent in the initial rinsing process to reduce the amount of fresh water required.

It will be observed that in the embodiment of FIG. 1, pressure on the filter cake is relieved by spacing the dip rollers 8 a sufficient distance apart so that compression forces normal to the planes of the belts 1, 2 is substantially relieved. This embodiment is preferred where the filter cake is to be immersed in a body of solvent since the filter cake remains trapped between the belts. Where the belts and filter cake are to be immersed in a body of solvent as shown in FIG. 1, it is perferred that the linear direction of travel of the belts be inclined with respect to the surface of the liquid in the tank to aid in washing the solvent into the filter cake.

Figure 2:
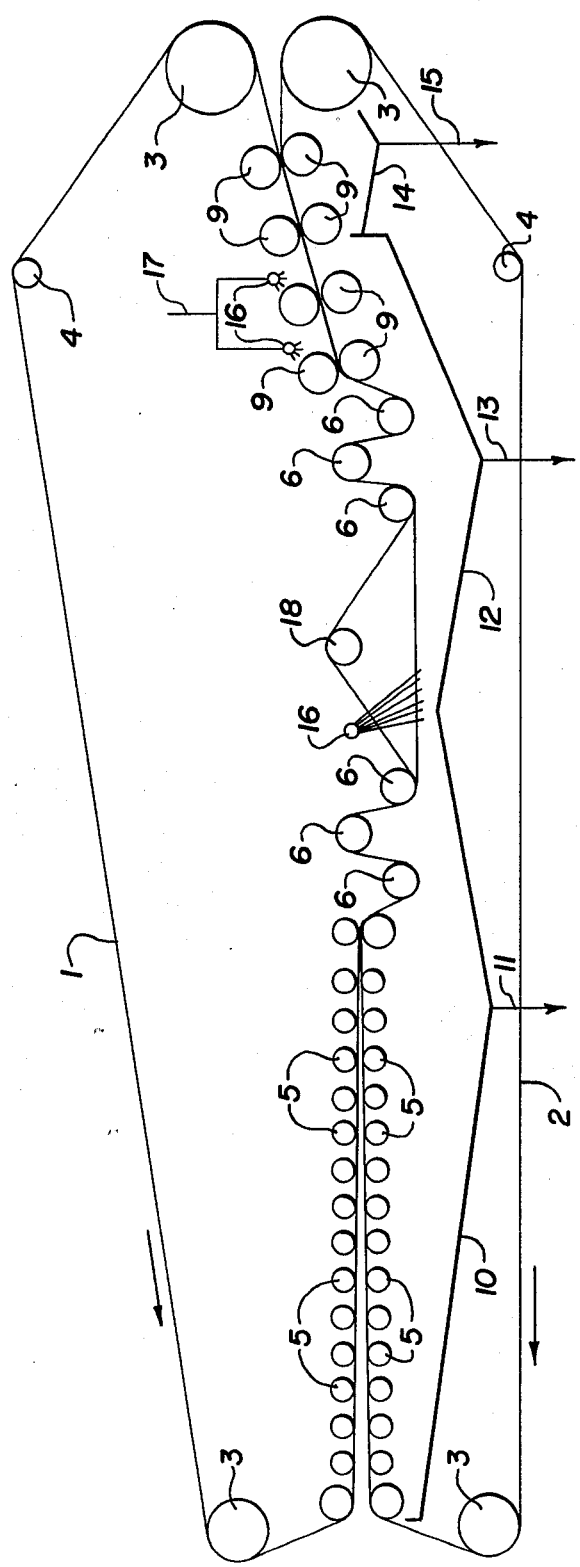
FIG. 2 is a schematic illustration of a double wire belt press employing an alternative embodiment of the invention.

In the alternative embodiment illustrated in FIG. 2, the belts and filter cake are suspended between two spaced apart rollers 8 as described hereinabove. However, an additional roller 18 is positioned intermediate rollers 8 and between the upper belt 1 and the filter cake. Intermediate roller 18 lifts the upper belt 1 completely off the filter cake which remains on and travels with the lower belt 2. A spray nozzle 16 is provided to spray solvent directly into the filter cake or onto the filter cake through the upper belt as illustrated. The upper belt 1 is then passed under the second roller 8 and rejoined with the filter cake for further processing of the filter cake as described hereinabove.

Figure 3:
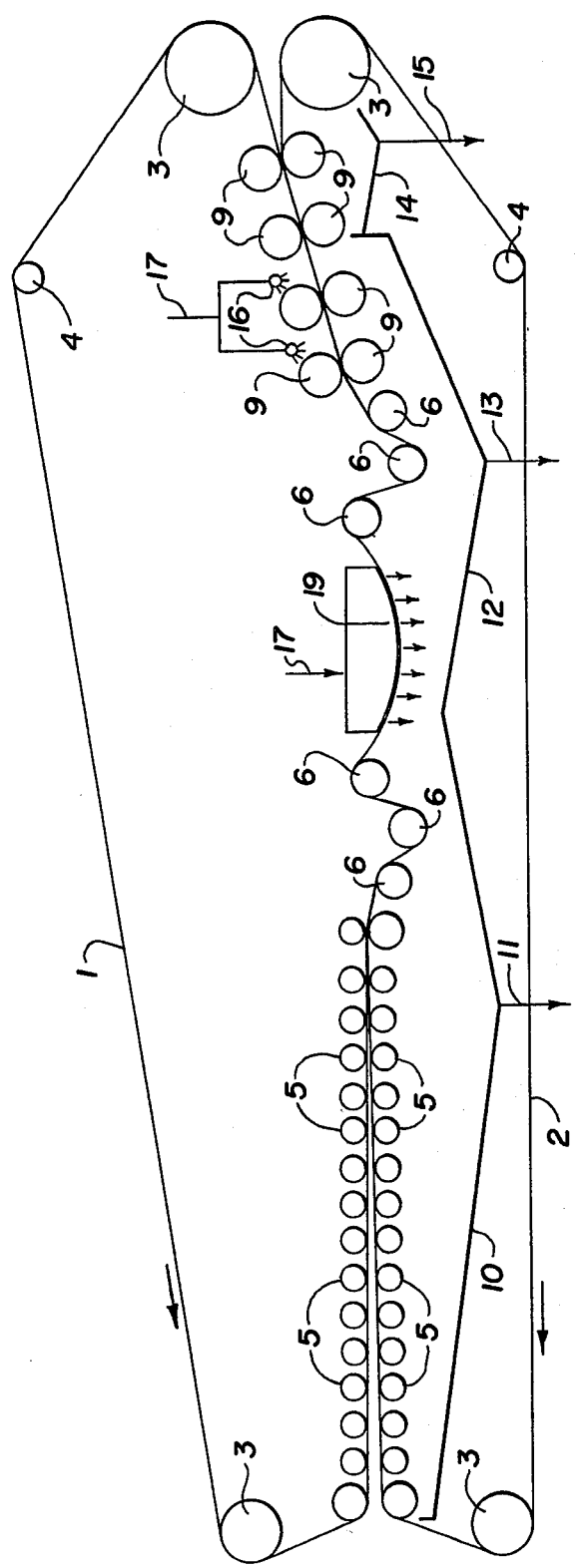
FIG. 3 is a schematic illustration of a double wire belt press employing still another alternative embodiment of the invention.

In the alternative embodiment of FIG. 3 the dip rollers 8 are eliminated and the belts and filter cake are suspended between the end rollers of the two spaced apart S sections. An arcuate surface 19 extending the width of the belts and curved in the direction of travel of the belts is positioned in contact with the top surface of the upper belt 1 in the span between the spaced apart end S rollers. The length of the span of arcuate surface 19 is at least twice the diameter of the smaller of the rollers at the end of the span to ensure that pressure on the belts normal to the direction of travel thereof is substantially relieved. The arcuate surface 19 is preferably perforated to permit solvent from solvent line 17 to pass directly therethrough into the belts and filter cake. If desired, surface 17 can be the surface of a tank or the like so that solvent may be injected into the filter cake under pressure, thus further assuring complete saturation of the filter cake.

From the foregoing it will be observed that the pressure on the filter cake exerted by the opposed belts in a double belt press can be substantially relieved by permitting the belts to span a substantial distance between two rollers. While the pressure is relieved, the filter cake may be exposed to solvent by a variety of means to re-wet the filter cake. The filter cake may then be again compressed to remove the added solvent and any soluble materials contained therein. Utilizing the principles of the invention, minimum amounts of solvent may be used to thoroughly re-wet the filter cake without major modification of the double belt press design and without deleteriously affecting machine operation or belt speeds.

While the invention has been described with particular reference to specific embodiments thereof, it is to be understood that the forms of the invention shown and described in detail are to be taken as preferred embodiments thereof. Various changes and modifications may be resorted to without departing from the spirit and scope of the invention as defined by the appended claims.

What is claimed:

1. The method of rinsing filter cake compressed between a pair of opposed belts travelling in the same direction between first and second rollers comprising the steps of:
   (a) exposing the filter cake to a solvent while said belts and filter cake are travelling between said first and second rollers;
   (b) substantially relieving the pressure exerted on said filter cake by said opposed belts while said belts and said filter cake are between said first and second rollers; and
   (c) re-applying pressure on said filter cake with said opposed belts after said belts pass said second roller.

2. The method set forth in claim 1 wherein said belts and filter cake are immersed in a body of liquid solvent between said first and second rollers.

3. The method set forth in claim 1 wherein said liquid solvent is sprayed on said filter cake between said first and second rollers.

4. The method set forth in claim 1 wherein the pressure on said filter cake is substantially relieved by spacing said first and second rollers apart from each other in the direction of travel of said belts by a distance of at least approximately three times the diameter of the smaller of said first and second rollers.

5. The method set forth in claim 1 wherein the pressure on said filter cake is substantially relieved by separating one of said belts from said filter cake while said belts are between said first and second rollers.

6. The method set forth in claim 2 wherein said the linear direction of travel of said filter cake between said first and second rollers is inclined with respect to the surface of said body of liquid solvent.

7. The method set forth in claim 1 wherein one of said belts is drawn across an arcuate surface between said first and second rollers, the length of said arcuate surface contacted by said belt being at least approximately two times the diameter of the smaller of said first and second rollers, and wherein said solvent is injected into said filter cake through said arcuate surface.

8. The method set forth in claim 1 including the additional step of spraying solvent onto said belts and said filter cake after re-applying pressure on said filter cake.

9. In apparatus for extracting liquid from a slurry of solid and liquid materials wherein said liquid is extracted by applying pressure to opposite sides of a pair of travelling belts while said slurry is positioned therebetween forming a filter cake between said belts, apparatus for rinsing said filter cake comprising:
  (a) means for temporarily substantially relieving the pressure applied to said filter cake by said travelling belts;
  (b) means for applying solvent to said filter cake while said pressure is temporarily substantially relieved; and
  (c) means for re-applying pressure to said filter cake after said solvent has been applied thereto.

10. Apparatus as defined in claim 9 wherein said means for temporarily relieving the pressure applied to said filter cake comprises first and second rollers supporting said belts at spaced-apart locations, the linear distance between said pair of rollers being at least approximately three times the diameter of the smaller of said rollers.

11. Apparatus as defined in claim 10 including means for separating one of said belts from said filter cake while said filter cake is between said first and second rollers.

12. Apparatus as defined in claim 10 wherein said means for applying solvent to said filter cake comprises a body of liquid solvent supported so that said filter cake is immersed in said liquid solvent between said first and second rollers.

13. Apparatus as defined in claim 12 wherein said first and second rollers are arranged to guide said filter cake from said first roller to said second roller along a course inclined to the surface of said body of liquid solvent.

14. Apparatus as defined in claim 10 wherein said means for applying solvent to said filter cake comprises a member having an arcuate surface contacting one of said belts between said first and second rollers, the length of said arcuate surface being at least approximately two times the diameter of the smaller of said first and second rollers, said apparatus further including means for injecting solvent through said arcuate surface and into said filter cake.

15. Apparatus as defined in claim 9 wherein said means for temporarily substantially relieving pressure applied to said filter cake comprises a roller positioned between said filter cake and the upper one of said belts to lift said upper one of said belts from said filter cake.

16. Apparatus as defined claim 9 including means for spraying solvent onto said belts after pressure has been re-applied to said filter cake.

* * * * *